Patented Oct. 16, 1945

2,387,205

UNITED STATES PATENT OFFICE 2,387,205

METHOD OF MAKING BERYLLIUM FLUORIDE

Charles B. Willmore, New Kensington, and Frank D. Chew, Haffey, Pa., assignors to Aluminum Company of America, Pittsburgh, Pa., a corporation of Pennsylvania No Drawing. Application April 24, 1943, Serial No. 484,477

17 Claims. (Cl. 23—88)

This invention relates to the production of beryllium fluoride which is a compound usable as a source of metallic beryllium as well as for other purposes. One object of the invention is to provide simple and economical methods by which beryllium may be extracted in the form of a fluoride from siliceous beryllium ores such as, for example, the mineral beryl. Beryl is a beryllium-aluminum silicate generally described by the formula $Be_3Al_2(Si_6O_{18})$. It can be considered, for practical purposes, as being composed of the oxides of beryllium, aluminum and silicon. Theoretically it contains about 5 per cent by weight of beryllium, although, as mined, it often contains as little as 3.5 per cent of that metal. Another object of the invention is the provision of methods by which beryllium oxide, or materials or mixtures containing the same, may be treated to form beryllium fluoride. A further object is to provide methods by which these objects may be achieved by treatment which do not involve the use of chemical solutions.

The invention comprises a process in which the material which affords a source of beryllium is mixed with aluminum fluoride and the mixture heated to cause reaction between the components thereof and the evolution therefrom of a vapor containing beryllium, which vapor may then be condensed and the condensate used or, if desirable or necessary, further treated to recover beryllium fluoride in substantially pure form. We have found that the temperatures necessary to promote the reaction in such a mixture are low, particularly when reduced pressures are used, and thus compatible with commercial operating conditions and available equipment. We have further found that the presence of magnesium fluoride will promote the efficiency and speed of the reaction. We have also found other conditions which will promote and expedite the recovery of beryllium fluoride, all of which are particularly described and explained in the following specific description of the methods of this invention.

When beryl, or other siliceous ore of beryllium, is the substance to be treated, it is first desirable to eliminate therefrom all or a greater part of the silica prior to the treatment with aluminum fluoride. Otherwise there will be preferentially formed, when the ore-aluminum fluoride mixture is heated, quantities of volatile silicon fluoride which will pass off as a vapor and thus impoverish the reaction mixture of fluoride available for forming beryllium fluoride. To eliminate the silica may not, within the sense of this invention, mean the physical removal of the silica from the ore or the reaction mixture, although this may, if desired, be effected; rather it means that the silica is either removed or converted in situ to silicon or to a silicon compound which does not readily react with aluminum fluoride in the heating of the mixture of aluminum fluoride and source of beryllium or otherwise render ineffective the fluorine of the aluminum fluoride. The step of eliminating the silica from the ore may therefore consist of any one of several treatments which will either reduce the silica to metallic silicon or will change the silica to a compound which is stable, as regards aluminum fluoride, at the temperatures of the proposed reaction. While there are several of such treatments, we prefer the following which have given good results and are also indicative of methods by which the silica may be eliminated from the ore.

(a) The beryl, first ground to a finely divided form, is mixed with sufficient carbon to reduce its predetermined silica content to metallic silicon. Iron is also added to the mixture. The mixture is then heated at high temperature, such as 1900° C. or higher, with the result that the silica is reduced to metallic silicon which then alloys with the iron to form ferro-silicon which is tapped off, leaving a molten slag substantially free of silica and composed of the oxides of beryllium and aluminum.

(b) The same mixture as is described above is heated at a temperature high enough to cause the silica to be reduced and permit the silicon to alloy with the iron to form ferro-silicon, but not high enough to melt the oxides of beryllium and aluminum. For example, a temperature of about 1300° C. or higher may be used satisfactorily. The ferro-silicon formed is not separated from the rest of the charge.

(c) The beryl is mixed with sufficient carbon to reduce the silica according to the reaction $Be_3Al_2(SiO_3)_6 + 18C = 3BeO + Al_2O_3 + 6SiC + 12CO$ and the mixture heated to temperatures of about 1500 to 1800° C. to produce said reaction, thus producing a mass consisting of the oxides of beryllium and aluminum and the product of reduction of the silica which may be the product indicated by the reaction formula.

(d) The beryl is mixed with at least enough alkali metal fluoride to form with the silica present the fluosilicate $R_2SiF_6$ where R equals the alkali metal. This mixture is then heated to effect the reaction to form said fluosilicate. This step may be conveniently practiced as a part of the beryllium fluoride-producing reaction, in which case aluminum fluoride is also added as described below; the alkali metal fluoride and the aluminum fluoride may also be introduced into the mixture, at least in part, by the use of a double fluoride of aluminum and alkali metal such as, for instance, cryolite or chiolite.

In process (a) above described the unwanted silica is actually removed from the beryl. In processes (b), (c), and (d) the silicon values of the silica remain with the other components of the beryl, but the silica is changed to a material—ferro-silicon in one case, probably silicon carbide in another, and alkali metal fluosilicate in the other—which is not noticeably reactive with the aluminum fluoride in the heating operation for producing beryllium fluoride. In all processes the silica has been, in the sense of this invention, eliminated from the siliceous beryllium ore.

It will be evident that whenever the siliceous ore is so treated there remains, apart from any silicon compound, the oxides of beryllium and aluminum. These are now, in accordance with the principles of this invention, mixed with aluminum fluoride and the mixture heated to produce beryllium fluoride in vapor form. For this purpose the reactants are reduced to a finely divided form—preferably 100 mesh size or smaller—and thoroughly mixed. If preferred, this mixture may then be briquetted to prevent dusting and to achieve more intimate contact of the components thereof, or it may be used in non-compacted form. If the bonding material used in making the briquettes contains volatile materials, these should preferably be driven off by a preliminary heating at less than reaction temperatures.

The proportioning of the reactants is of some consequence. For efficient operation the aluminum fluoride should be present in amounts of at least two molecules thereof for every three molecules of beryllium oxide. However, some of the aluminum fluoride may volatilize as such in the process, and additional fluorine values may be lost if residual silica or other material with which aluminum fluoride reacts in the process, other than beryllium oxide, is present in the reaction mixture. Consequently, it is desirable to furnish sufficient aluminum fluoride in the reaction mixture to provide an aluminum fluoride-beryllium oxide molecular ratio of 2:3 in addition to such aluminum fluoride as volatilizes or takes part in side reactions, in order to insure that the highest possible yield of beryllium fluoride is obtained. The best manner in which to ascertain the excess necessary for maximum results is to make a trial test of the method and analyze the sublimate obtained by condensing the vapor, as well as the residue of the reaction, to determine the distribution of the fluorine during reaction.

The reaction mixture thus formed is then heated. If the heating takes place at atmospheric pressures, the temperature should be maintained at at least 1000° C., and for best results a temperature of at least 1200° C. is preferred. By conducting the reaction at reduced pressures somewhat lower temperatures can be employed without lowering the speed and efficiency of the operation; however, even when a residual pressure of as low as 0.15 mm. of mercury is used the temperature employed should be at least 700° C. and, for best results, at least 1000° C. If a double fluoride of aluminum and alkali metal is used as a source of aluminum fluoride, either for purposes of convenience or, as pointed out above, for the purpose of also bringing alkali metal fluoride to the reaction and thus effecting conversion of the silica to $R_2SiF_6$ and production of beryllium fluoride at the same time, the minimum temperatures to be employed are slightly higher than above stated. Thus, when the reaction is at atmospheric pressure a temperature of at least 1100° C. should be used, and when the reaction is at reduced pressure a temperature of at least 900° C. should be used.

At these temperatures the reaction proceeds to the production of beryllium fluoride in vapor form and the vapor is drawn or led from the reaction mass to a relatively cool condensing surface where it is condensed and thus recovered. The condensate may contain other substances, notably aluminum fluoride, and also alkali metal fluoride in some quantity where one of the reactants is an alkali metal fluoride, as well as other impurities. If desired, these additional substances may be removed from the beryllium fluoride by fractional distillation and condensation.

It will be noted that in the complete process of treating the beryl or other siliceous ore to obtain beryllium fluoride, it is often possible to combine the step of eliminating the silica content of the ore with the step of converting the beryllium content of the ore to beryllium fluoride in vapor form. This is particularly true where an alkali fluoride is used as the eliminating agent, and is also true where carbon is used to convert the silica to silicon carbide.

When an ore of beryllium which does not contain substantial amounts of aluminum is to be used as the source of beryllium—for example, when beryllium oxide is used as the source of beryllium—it will be found that the addition to the reaction mixture of alumina or magnesia will increase the efficiency of the reaction, at least in the sense of greater yields per unit time. The exact action of these materials is not entirely understood, but they are apparently inert during the reaction and do not appear to enter into it. When present in an amount as low as 10 per cent of the reaction mixture, their effect is noticeable, and the amount of alumina or magnesia which will give best results may be easily determined by trial under the operating conditions above noted.

We have further found that magnesium fluoride will, when present in the reaction mixture, materially increase the yield of the beryllium fluoride obtained in a given time by the practice of the methods of this invention. This is true even when the magnesium fluoride added replaces a part of the aluminum fluoride and thus does not increase the fluorine available to the reaction.

In conducting the methods above described for the production of beryllium fluoride, we prefer to volatilize the fluoride in an atmosphere inert thereto. When the reaction takes place at low pressures, the presence of a partial vacuum usually produces the desired result, but when the heating is carried out at atmospheric pressures we prefer to supply an inert atmosphere in contact with the reaction mixture such as, for instance, a hydrogen or producer gas atmosphere, substantially free from moisture.

Set forth below are specific examples of the production of beryllium fluoride in accordance with the principles of this invention:

*Example I*

Finely ground beryl and carbon were mixed thoroughly in the proportions of 72 parts by weight of beryl and 28 parts by weight of carbon, and briquetted under pressure. The briquettes were then heated at 1600° C., to convert the silica of the beryl to silicon carbide. The briquettes and aluminum fluoride were ground together to 100 mesh size or finer, the mix consisting of 140 parts by weight of the carbon-reduced beryl, and 60 parts by weight of aluminum fluoride. The mixture was then placed in one end of a closed horizontal retort through which a flow of gas could be maintained, and heated at 1200° C. for 4 hours at atmospheric pressure, while maintaining a flow of about 5 cubic feet per hour of producer gas across the mixture and toward the cooler end of the retort. Upon being opened, the retort was found to contain at the cooler end thereof a sublimate composed of 79 per cent beryllium fluoride, and 13 per cent aluminum fluoride. The beryllium fluoride represented 60 per cent of the beryllium present in the carbon-reduced beryl.

*Example II*

Beryl was treated to eliminate silica therefrom by mixing therewith carbon in amount sufficient to reduce the silica, and also mixing therewith iron. The mixture was heated at about 2000° C. and the resultant ferro-silicon separated from the remaining slag. This slag, which contained about 37 per cent by weight of beryllium oxide, the balance being aluminum oxide, was then mixed with aluminum fluoride and magnesium fluoride in the following approximate proportions: slag 49 per cent by weight, aluminum fluoride 24 per cent by weight, magnesium fluoride 27 per cent by weight. All ingredients of the mixture were of 100 mesh size or smaller. The mixture was briquetted and the briquettes placed in a closed horizontal retort. There they were heated for 1 hour at 900° C. at atmospheric pressure after which the pressure was reduced to 2 mm. of mercury and the temperature raised to 1200° C. After 4 hours at this temperature 88 per cent of the beryllium content of the reaction mixture had vaporized and had been condensed as beryllium fluoride. The condensate contained about 83 per cent of beryllium fluoride, the balance being largely comprised of aluminum fluoride and magnesium fluoride.

*Example III*

Aluminum fluoride and beryllium oxide, ground to at least 100 mesh size, were mixed thoroughly in the proportions of 45 parts by weight of beryllium oxide and 105 parts by weight of aluminum fluoride, and the mixture was briquetted under pressure in a mold. The briquettes were placed in one end of a closed, horizontal retort having a vacuum pump attached to the opposite end and were heated at 1000° C. for 1 hour, after which the heating was continued for 4 hours while the residual gas pressure in the retort was maintained at 24 mm. of mercury by means of the vacuum pump. The portion of the furnace adjacent the end to which the vacuum pump was attached remained cool enough to condense the vapors produced from the briquettes. Upon being opened, the retort contained sublimate composed of 77 per cent of beryllium fluoride and 18 per cent aluminum fluoride, and the beryllium fluoride represented 70 per cent of the beryllium present in the original mix.

Divisional applications of the present case and our copending case 484,476, claiming related subject matter, have been filed as Serial Numbers 578,940, 578,941, and 578,942.

We claim:

1. The method of recovering beryllium values in the form of beryllium fluoride from siliceous beryllium ores which comprises treating the ore to eliminate silica therefrom, mixing the treated ore with aluminum fluoride, heating said mixture at a temperature above 700° C., and condensing the resultant vapor.

2. The method of recovering beryllium values in the form of beryllium fluoride from siliceous beryllium ores which comprises treating the ore to eliminate silica therefrom, mixing the treated ore with aluminum fluoride and magnesium fluoride, heating said mixture at a temperature of at least 1000° C., and condensing the resultant vapor.

3. The method of recovering beryllium values in the form of beryllium fluoride from siliceous beryllium ores which comprises treating the ore to eliminate silica therefrom, mixing the treated ore with aluminum fluoride, heating said mixture at a temperature of at least 1000° C., and condensing the resultant vapor.

4. The method of recovering beryllium values in the form of beryllium fluoride from siliceous beryllium ores which comprises treating the ore to eliminate silica therefrom, mixing the treated ore with aluminum fluoride, heating said mixture at a temperature of at least 1200° C. at atmospheric pressure, and condensing the resultant vapor.

5. The method of recovering beryllium values in the form of beryllium fluoride from siliceous beryllium ores which comprises treating the ore to eliminate silica therefrom, mixing the treated ore with aluminum fluoride and magnesium fluoride, heating said mixture at a temperature of at least 1200° C. at atmospheric pressure, and condensing the resultant vapor.

6. The method of treating siliceous beryllium ore to recover beryllium fluoride therefrom which comprises forming a mixture of ore, iron, and sufficient carbon to reduce at least part of the silica of said ore, heating said mixture at a temperature sufficient to cause the said reduction of silica to take place, mixing the resultant product with aluminum fluoride, heating said mixture at a temperature of at least 700° C., and condensing the resultant vapor.

7. The method of treating siliceous beryllium ore to recover beryllium fluoride thereform which comprises forming a mixture of ore, iron, and sufficient carbon to reduce at least part of the silica of said ore to metallic silicon, heating said mixture at a temperature of at least 1900° C., removing the ferro-silicon thus formed, mixing the residue with aluminum fluoride, heating said mixture at a temperature of at least 1000° C., and condensing the resultant vapor.

8. The method of treating siliceous beryllium ore to recover beryllium fluoride therefrom which comprises mixing the ore with sufficient carbon to convert at least a part of the silica content thereof, effecting said conversion by heating said mixture at temperatures between about 1500° C. and 1800° C., mixing the resultant product with aluminum fluoride, heating said mixture at a temperature of at least 1000° C., and condensing the resultant vapor.

9. The method of treating siliceous beryllium ore to recover beryllium fluoride therefrom which comprises mixing the ore with sufficient alkali metal fluoride to convert at least part of the silica content thereof to alkali metal fluosilicate, heating the mixture to effect such conversion, mixing the resultant ore-fluosilicate mass with aluminum fluoride, heating said mixture at a temperature of at least 1000° C., and condensing the resultant vapor.

10. The method of treating siliceous beryllium ore to recover beryllium fluoride therefrom which comprises mixing the ore with sufficient carbon to convert at least part of the silica content thereof, effecting said conversion by heating said mixture at temperatures between about 1500° C. and 1800° C., mixing the resultant product with aluminum fluoride and magnesium fluoride, heating said mixture at a temperature of at least 1000° C., and condensing the resultant vapor.

11. The method of making beryllium fluoride which comprises forming a mixture containing beryllium oxide and aluminum fluoride, heating said mixture at a temperature of at least 700° C., and condensing the resultant vapor.

12. The method of making beryllium fluoride which comprises forming a substantially silica-free mixture containing beryllium oxide and aluminum fluoride, heating said mixture at a temperature of at least 700° C., and condensing the resultant vapor.

13. The method of making beryllium fluoride which comprises forming a substantially silica-free mixture containing beryllium oxide, aluminum fluoride and magnesium fluoride, heating said mixture at a temperature of at least 700° C., and condensing the resultant vapor.

14. The method of making beryllium fluoride which comprises forming a mixture of beryllium oxide, aluminum oxide and aluminum fluoride, heating said mixture at a temperature of at least 700° C., and condensing the resultant vapors.

15. The method of making beryllium fluoride which comprises forming a substantially silica-free mixture of beryllium oxide, aluminum oxide and aluminum fluoride, heating said mixture at a temperature of at least 700° C., and condensing the resultant vapors.

16. The method of making beryllium fluoride which comprises forming a substantially silica-free mixture of beryllium oxide, magnesium oxide and aluminum fluoride, heating said mixture at a temperature of at least 700° C., and condensing the resultant vapors.

17. The method of making beryllium fluoride which comprises forming a substantially silica-free mixture of beryllium oxide, aluminum oxide, aluminum fluoride and magnesium fluoride, heating said mixture at a temperature of at least 700° C., and condensing the resultant vapors.

CHARLES B. WILLMORE.
FRANK D. CHEW.